United States Patent
Fangmeier

(10) Patent No.: US 10,296,019 B2
(45) Date of Patent: May 21, 2019

(54) PRESSURE RELIEF VAVLE

(71) Applicant: Neoperl GmbH, Mullheim (DE)

(72) Inventor: Martin Fangmeier, Auggen (DE)

(73) Assignee: Neoperl GmbH, Müllheim (DE)

( * ) Notice: Subject to any disclaimer, the term of this patent is extended or adjusted under 35 U.S.C. 154(b) by 223 days.

(21) Appl. No.: 15/119,037

(22) PCT Filed: Jan. 31, 2015

(86) PCT No.: PCT/EP2015/000188
§ 371 (c)(1),
(2) Date: Aug. 15, 2016

(87) PCT Pub. No.: WO2015/161905
PCT Pub. Date: Oct. 29, 2015

(65) Prior Publication Data
US 2016/0357198 A1  Dec. 8, 2016

(30) Foreign Application Priority Data
Apr. 22, 2014 (DE) .................... 20 2014 003 386 U

(51) Int. Cl.
*F16K 1/12* (2006.01)
*F16K 27/02* (2006.01)
(Continued)

(52) U.S. Cl.
CPC ........... *G05D 16/106* (2013.01); *F16K 1/126* (2013.01); *F16K 27/02* (2013.01); *F16K 31/1221* (2013.01); *F16K 31/1223* (2013.01)

(58) Field of Classification Search
CPC ......... Y10T 137/7869; Y10T 137/3421; Y10T 137/7923; Y10T 137/7793;
(Continued)

(56) References Cited

U.S. PATENT DOCUMENTS 3,945,393 A * 3/1976 Teatini .................... F16K 1/126
                                                137/220
4,015,630 A * 4/1977 Contreras ........... B63C 11/2245
                                                128/205.24
(Continued)

FOREIGN PATENT DOCUMENTS

EP       1482389      1/2004
GB       2198501 A  * 6/1988  ............. F16K 1/126

*Primary Examiner* — Craig M Schneider
*Assistant Examiner* — Frederick D Soski
(74) *Attorney, Agent, or Firm* — Volpe and Koenig, P.C.

(57) ABSTRACT

The present invention relates to a pressure-reducing valve (1) having a valve housing (2), in the housing interior of which is provided a valve carrier (4) which has at least one through-flow channel (5), and having a pot-shaped valve body (3) which is guided displaceably from an open position into a closed position in opposition to a restoring force, in which closed position the valve body (3) abuts by way of the circumferential edge (6) of its pot shape in such a manner against a valve seat (7), which is provided on the valve carrier (4), that the valve body (3) closes at least one channel opening (8) of the at least one through-flow channel (5). It is characteristic of the pressure-reducing valve (1) according to the invention that at least one retaining sleeve (9), into which in each case a retaining pin (10) provided on the valve body (3) or on the valve carrier (4) protrudes, is provided on the valve carrier (4) or on the valve body (3), and that a stop (11), which interacts with a counter stop (12) on the outside circumference of the retaining pin (10) in such a manner that in the open position of the pressure-reducing valve (1) the stop (11) and the counter stop (12) delimit the sliding distance of the valve body (3) relative to the valve carrier (4), is provided on the inside circumference of the retaining sleeve (9).

14 Claims, 4 Drawing Sheets

(51) Int. Cl.
  *G05D 16/10* (2006.01)
  *F16K 31/122* (2006.01)

(58) Field of Classification Search
  CPC ......... Y10T 137/7796; Y10T 137/7808; Y10T 137/7835; Y10T 137/7728; G05D 16/106; F16K 1/126; F16K 27/02; F16K 31/1221; F16K 31/1223
  See application file for complete search history.

(56) References Cited

U.S. PATENT DOCUMENTS

| | | | | |
|---|---|---|---|---|
| 4,172,470 A | * | 10/1979 | Walker | F16K 1/126 137/516.29 |
| 4,610,332 A | * | 9/1986 | Mourray | F16F 9/348 137/517 |
| 4,858,644 A | * | 8/1989 | Decker | E21B 34/06 137/504 |
| 4,911,196 A | * | 3/1990 | Kemp | F16K 15/026 137/220 |
| 5,144,976 A | * | 9/1992 | Crumb | B60T 8/265 137/509 |
| 5,465,752 A | * | 11/1995 | Higgins | A62C 35/68 137/512.5 |
| 5,603,352 A | * | 2/1997 | Tavor | F16K 1/126 137/594 |
| 5,653,257 A | * | 8/1997 | Johnston | F16K 17/30 137/517 |
| 5,704,391 A | * | 1/1998 | McGowan, Jr. | F16K 17/12 137/454.2 |
| 5,755,259 A | * | 5/1998 | Schulze | F16K 17/30 137/460 |
| 5,957,197 A | * | 9/1999 | Xia | E21B 21/10 137/517 |
| 6,216,721 B1 | * | 4/2001 | Perez | F16K 1/126 137/219 |
| 6,427,711 B1 | * | 8/2002 | Kemp | F16K 15/026 137/15.18 |
| 2006/0054848 A1 | * | 3/2006 | Vogt | F02B 37/013 251/77 |
| 2008/0083463 A1 | * | 4/2008 | Fazekas | F24D 19/1018 137/512.1 |
| 2012/0138839 A1 | | 6/2012 | Fangmeier | |

\* cited by examiner

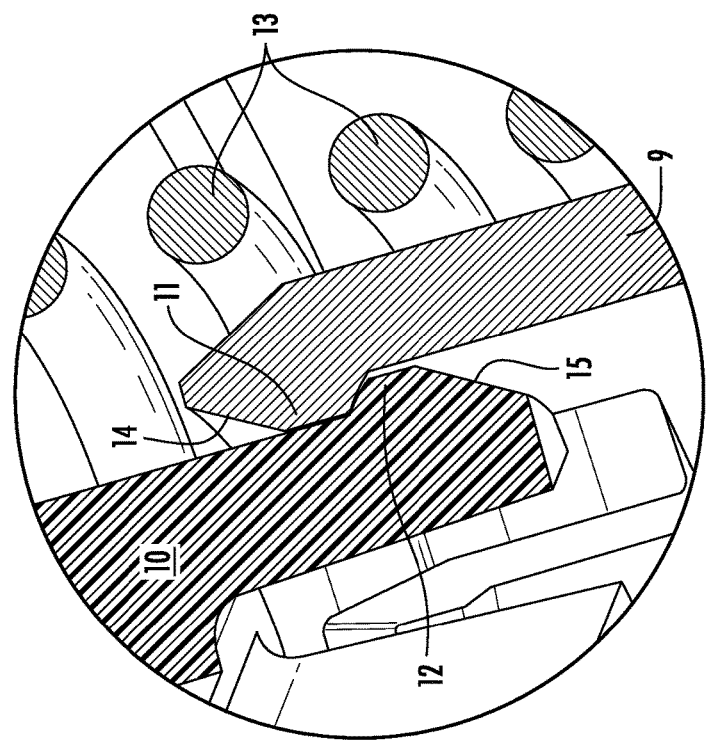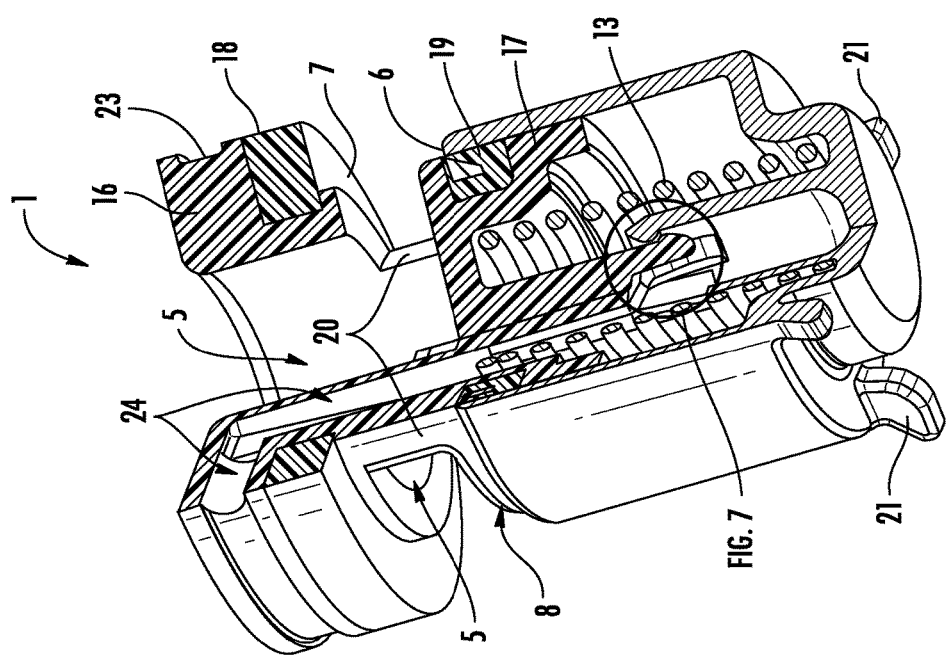

PRESSURE RELIEF VAVLE

BACKGROUND

The invention relates to a pressure-reducing valve having a valve housing, in the housing interior of which is provided a valve carrier which has at least one through-flow channel, and having a pot-shaped valve body which is guided displaceably from an open position into a closed position in opposition to a restoring force, in which closed position the valve body abuts by way of the circumferential edge of its pot shape in such a manner against a valve seat, which is provided on the valve carrier, that the valve body closes at least one channel opening of the at least one through-flow channel, wherein at least one retaining sleeve is arranged on the valve carrier or on the valve body, wherein a stop, which interacts with a counter stop on the retaining pin in such a manner that in the open position of the pressure-reducing valve, the stop and the counter stop delimit the sliding distance of the valve body relative to the valve carrier, is provided on the retaining sleeve, and wherein the valve carrier has a valve carrier portion, on which is provided an annular seal by way of which the valve body portion abuts sealingly against the housing inside circumference of the valve housing.

Sanitary showers, which comprise a shower head with a large-format shower area which supports a large number of comparatively small shower openings, are increasingly popular. A shower, which is formed from a plurality of fine threadlike individual streams, can be created by means of such showers. A disadvantage, however, is that the shower openings, which have a comparatively small internal cross section, can easily close as a result of limescale and dirt deposits. As the number of closed shower openings increases, there is a heightened risk that the water flowing into the shower head builds up a pressure there which can cause the shower head to deform and ultimately break. Pressure-reducing valves, which limit the water pressure in the pipe portion located downstream of the pressure-reducing valve to a fixed maximum value, have already been created in order not to allow the water pressure to increase in such a manner that at least individual flow-conducting components are likely to burst.

Thus, a pressure-reducing valve of the type named in the introduction, which is insertable into a water pipe, has already been disclosed in EP 1 482 389 B1. The disclosed pressure-reducing valve comprises a valve housing, in the housing interior of which is provided a pot-shaped valve body. The disclosed pressure-reducing valve has a valve carrier in which at least one through-flow channel is provided. The pot-shaped valve body is guided displaceably under the pressure of the traversing medium from an open position into a closed position in opposition to a restoring force, in which closed position the valve body abuts by way of the circumferential edge of its pot shape in such a manner against a valve seat, which is provided on the valve carrier, that the valve body closes at least one channel outlet of the at least one through-flow channel. If the water pressure in the pipe portion located upstream of the pressure-reducing valve exceeds a certain water pressure, the valve body is slid and pressed in such a manner over the valve carrier that the at least one channel opening of the at least one through-flow channel is increasingly closed. In this case, a restoring force, which is applied by a compression spring or by a gas cushion enclosed in the valve body, acts on the valve body. The design of the disclosed pressure-reducing valve has many parts and is complex. Due to the restoring element required as restoring force, there is the risk of the valve carrier and the valve body being pressed apart from one another and the disclosed pressure-reducing valve disintegrating into its component parts. As a result, the mounting of the disclosed pressure-reducing valve is made even more difficult.

US 2012/0138839 discloses a valve which can be inserted into a sanitary supply pipe. The valve comprises a valve housing, a valve carrier and a displaceable valve body. A through-flow can be closed off by means of the valve body, the sliding distance of the valve body relative to the valve carrier is limited as a result of the interaction between a stop and a counter stop.

Consequently, the object, in particular, is to create a pressure-reducing valve of the type mentioned in the introduction which is distinguished by its simplified mounting.

SUMMARY

Said object is achieved according to the invention with the pressure-reducing valve of the type mentioned in the introduction in particular in that a retaining pin, which is provided on the valve body or on the valve carrier, in each case protrudes into the at least one retaining sleeve, that the stop is provided on the inside circumference of the retaining sleeve and the counter stop is provided on the outside circumference of the retaining pin, and that, in the closed position of the pressure-reducing valve, the valve body abuts by way of the circumferential edge of its pot shape in such a manner against the valve seat, which is provided on the valve carrier and is formed by the annular seal, that the valve body closes at least one channel opening of the at least one through-flow channel.

The pressure-reducing valve according to the invention has a valve housing which is insertable into a fluid pipe or can be connected in between. A pot-shaped valve body is provided in the housing interior of the pressure-reducing valve. The pressure-reducing valve according to the invention also has a valve carrier in which at least one through-flow channel is provided. The valve body is guided displaceably under the pressure of the traversing medium from an open position into a closed position in opposition to the restoring force of at least one restoring element, in which closed position the valve body abuts by way of the circumferential edge of its pot form in such a manner against a valve seat, which is provided on the valve carrier, that the valve body closes at least one channel opening of the at least one through-flow channel. As the valve body is pressed increasingly in the direction of the valve carrier in opposition to the restoring force when the water pressure in the pipe portion located upstream of the pressure-reducing valve increases, the pressure of the fluid in the pipe portion located downstream of the pressure-reducing valve is limited to a fixed maximum value. At least one retaining sleeve, into which a retaining pin, which is arranged on the respectively other component, protrudes, is provided according to the invention on the valve carrier or on the valve body. A stop, which interacts in such a manner with a counter stop on the outside circumference of the retaining pin that in the open position of the pressure-reducing valve the stop and the counter stop delimit the sliding distance of the valve body relative to the valve carrier, is provided on the inside circumference of the retaining sleeve. As the stop and the counter stop which interacts therewith limit the sliding distance of the valve body relative to the valve carrier into the open position, the pressure-reducing valve according to the invention is prevented from falling apart inadvertently during storage, transport or mounting. The valve carrier, the valve body and the restoring element that is active between them consequently form in practice one insertion unit which only has to be inserted into the valve housing to complete the pressure-reducing valve according to the invention. In the case of the pressure-reducing valve according to the invention, one of the annular seals which surround the ventilation opening also serves simultaneously as a valve seat for the valve body. As the pressure-reducing valve according to the invention consequently manages with one annular seal, the pressure-reducing valve according to the invention can be developed in a considerably shorter manner and is distinguished by simplified producibility and mountability. The simple production and mounting of the pressure-reducing valve according to the invention is favored even further as a result of the pressure-reducing valve according to the invention not requiring a housing cage.

In order to be able to dimension the sliding distance of the valve body relative to the valve carrier so that it is sufficiently long, it is advantageous when the stop is arranged on the free end face region of the retaining sleeve. A sliding distance that is dimensioned to be sufficiently long is favored even more when the counter stop is arranged on the free end face region of the retaining pin.

The valve body and the valve carrier rotating does not even influence the function of the stop and of the counter stop when the stop and/or the counter stop is/are realized as a circumferential annular flange or annular bead on the circumference.

In order to be able to connect the retaining sleeve and the retaining pin together, it is advantageous when at least one of the annular flanges comprises a run-up gradient or run-up flank which tapers toward the free end face of the retaining sleeve and/or of the retaining pin.

A secure method of operation of the pressure-reducing valve according to the invention is favored when the retaining pin and the retaining sleeve are aligned coaxially with respect to one another and to the valve housing longitudinal axis.

The restoring element which serves as a restoring force can be, for example, a rubber elastic component. A particularly simple and expedient embodiment according to the invention, however, provides that the at least one restoring element which serves as a restoring force is a helical compression spring.

This helical compression spring can develop its restoring force in a particularly good manner without the valve body and the valve carrier canting against one another, when the at least one helical compression spring which serves as a restoring element engages around the retaining pin and the retaining sleeve.

So that the valve body can be guided displaceably on the valve carrier in a functionally reliable manner, the valve carrier has a valve carrier portion, which abuts sealingly against the housing inside circumference of the valve housing. In this case, a preferred embodiment according to the invention provides that the valve carrier portion of the valve carrier is realized in a plate-shaped manner.

So that the valve body can be slid and pressed increasingly onto the valve body as the pressure of the fluid rises, it is advantageous when the valve carrier has a guide portion, on which guide portion the pot-shaped valve body is displaceably guided by way of its valve body inside circumference.

So that the traversing fluid can pass through the pressure-reducing valve in the region of its valve body portion only through the at least one through-flow channel, an annular seal is provided on the valve body portion. So that it is not possible for an excessively high counter pressure to build up in the pot interior of the pot-shaped valve body, it is advantageous when an annular seal is provided on the guide portion.

A preferred embodiment according to the invention provides that the valve body portion and the guide portion are connected together by a connection portion of the valve carrier.

In this case, a preferred further development according to the invention provides that the at least one channel opening of the at least one through-flow channel is provided on the connection portion. In this case, it is particularly advantageous when said channel opening is closed by the inside circumference wall of the pot-shaped valve body in the closed position of the pressure-reducing valve according to the invention.

It is particularly advantageous when at least one sliding element is provided on the outside circumference of the valve body, which sliding element protrudes in such a manner in the radial direction beyond the valve body that an annular channel is formed between the housing inside circumference of the valve housing on the one hand and the outside circumference of the valve body on the other hand. The traversing fluid can pass through said annular channel up to the channel inlet of the at least one through-channel in order then to pass through the valve carrier through said through-flow channel.

Further developments according to the invention are produced from the figures in conjunction with the description and the claims. The invention is described in more detail below by way of a preferred exemplary embodiment.

BRIEF DESCRIPTION OF THE DRAWINGS

The figures are as follows:

FIG. 6 shows a part longitudinal section of the unit of the pressure-reducing valve shown in FIGS. 1 to 5, said unit being formed from the pot-shaped valve body, the valve carrier and a restoring element, FIG. 7 shows a longitudinal section of a detail of the pressure-reducing valve from FIGS. 1 to 6 in the region of a retaining sleeve which interacts with a retaining pin, the retaining sleeve and the retaining pin holding the valve carrier and the valve body against one another in their open position.

DETAILED DESCRIPTION OF THE PREFERRED EMBODIMENTS

Figure 3:
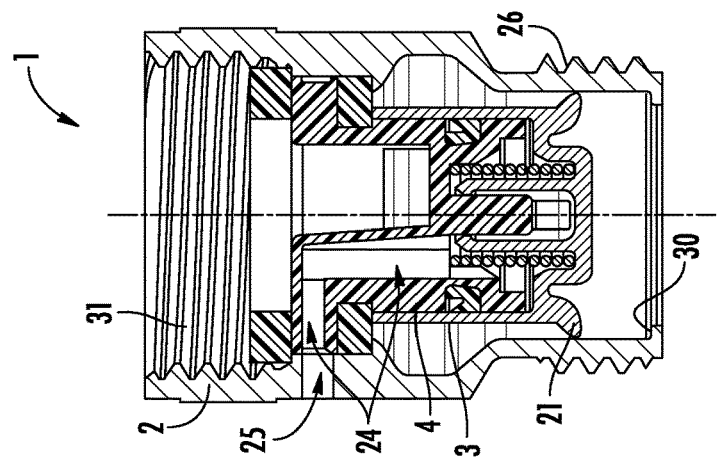
FIG. 3 shows the pressure-reducing valve from FIGS. 1 and 2 in its closed position, in which closed position the pot-shaped valve body abuts sealingly against a valve seat of the valve carrier.
Figure 2:
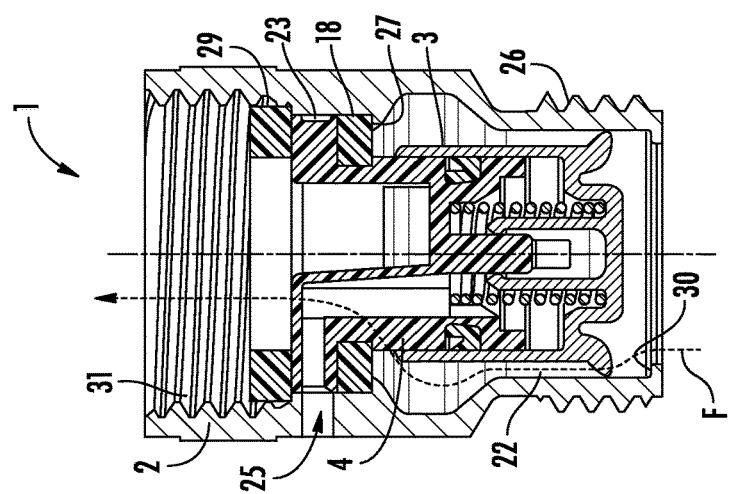
FIG. 2 shows the pressure-reducing valve from FIG. 1 with the valve body and the valve carrier in an intermediation position.
Figure 1:
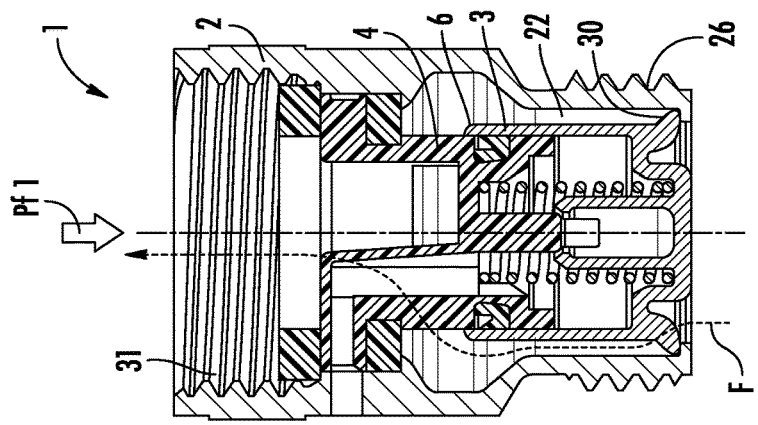
FIG. 1 shows a longitudinal section of a pressure-reducing valve with a valve housing, in the housing interior of which a pot-shaped valve body is provided, and with a valve carrier, the valve body being situated here in an open position of the pressure-reducing valve.

A pressure-reducing valve 1, which is traversed in the direction of the arrow Pf1 and which is insertable, for example, in a water pipe in order to limit the water pressure in the pipe portion located downstream of the pressure-reducing valve to a fixed maximum value, is shown in FIGS. 1 to 8. The pressure-reducing valve 1 has a valve housing 2 which can be inserted or interposed in a fluid pipe. A pot-shaped valve body 3 is provided in the housing interior of the valve housing 2. The pressure-reducing valve 1 has a valve carrier 4 in which at least one through-flow channel 5 is provided. The flow path F is indicated with a dashed line in FIGS. 1 and 2. If the pipe cross section in the pipe portion located downstream is constricted and the water pressure rises there increasingly, the displaceably guided valve body 3 is moved under the pressure of the traversing medium from an open position shown in FIG. 1 into a closed position shown in FIG. 3 in opposition to the resetting force of at least one restoring element, in which closed position the valve body 3 abuts by way of the circumferential edge 6 of its pot form in such a manner against a valve seat 7, which is provided on the valve carrier 4, that the valve body 3 closes at least one channel opening 8 of the at least one though-flow channel 5. As the valve body 3, when the water pressure rises in the pipe portion located upstream of the pressure-reducing valve 1, is pressed increasingly in the direction of the valve carrier 4 in opposition to the restoring force of the at least one restoring element and the pressure loss consequently increases at the channel opening 8 which is becoming smaller as a result, the pressure of the fluid in the pipe portion located downstream of the pressure-reducing valve is limited to a fixed maximum value.

It can be seen particularly well in FIGS. 6 and 7 that a central retaining sleeve 9 is provided on the inside of the end face of the pot bottom of the valve body 3, into which retaining sleeve a retaining pin 10, which is arranged on the valve carrier 4, protrudes. A stop 11 is provided on the inside circumference of the retaining sleeve 9, said stop 11 interacts in such a manner with a counter stop 12 on the outside circumference of the retaining pin 10 that in the open position of the pressure-reducing valve 1 the stop 11 and the counter stop 12 limit the sliding distance of the valve body 3 relative to the valve carrier 4. As the stop 11 and the counter stop 12 which interacts therewith limit the sliding distance of the valve body 3 relative to the valve carrier 4 into the open position, the pressure-reducing valve 1 shown here is prevented from falling apart inadvertently during storage, transport or mounting. The valve carrier 4, valve body 3 and the restoring element that is active between them consequently form in practice, together with the associated annular seals 18, 19, one insertion unit which only has to be inserted into the valve housing 2 to complete the pressure-reducing valve 1 according to the invention. The mounting of the pressure-reducing valve 1 shown here is made considerably easier as a result.

It can be seen in FIGS. 4 to 7 that the at least one restoring element is realized here as a helical compression spring 13. In this case, the helical compression spring 13, which serves as a restoring element, engages around the retaining pin 10 and the retaining sleeve 9. The retaining pin 10 and the retaining sleeve 9 are aligned coaxially with respect to one another and to the valve housing longitudinal axis. It can be seen in FIG. 7 that the stop 11 is arranged on the free end face region of the retaining sleeve 9. In order to be able to dimension the sliding distance of the valve body, which is guided displaceably on the valve carrier 4, so that is it is sufficiently long, the counter stop 12 is also arranged on the free end face region of the retaining pin 10. In order not to impair the functioning of the pressure-reducing valve 1, even if the valve body 3 and the valve carrier 4 are twisted relative to one another, the stop 11 and the counter stop 12 are realized in each case as a circumferential annular flange or annular bead on the circumference.

Both the stop 11 which is provided on the inside circumference of the retaining sleeve 9 and the counter stop 12 which is arranged on the outside circumference of the retaining pin 10 comprise a run-up gradient or run-up flank 14, 15 which taper toward the free end face of the retaining sleeve 9 or of the retaining pin 10. FIG. 7 shows that the stop 11, which is provided on the retaining sleeve 9, and the counter stop 12, which protrudes laterally on the retaining pin 10, engage behind one another in such a manner that the valve body 3 and the valve carrier 4 are held against one another in the open position of the pressure-reducing valve 1.

It is clear from FIG. 6 that the valve carrier 4 has a valve carrier portion 16, which valve carrier portion 16 abuts sealingly against the housing inside circumference of the valve housing 2 and which, with the pressure-reducing valve 1 in the operating position, is held in an immovable manner in the housing interior of the valve housing 2. This valve carrier portion 16 is realized in a substantially plate-shaped manner.

The valve carrier 4 has a guide portion 17, by which guide portion 17 the valve body 3 is displaceably guided by way of its valve body inside circumference. This guide portion 17 of the valve carrier 4, on its end face directed to the valve body interior, comprises the retaining sleeve or—as in this case—the retaining pin 10.

So that the traversing fluid is able to pass through the pressure-reducing valve only through the at least one through-flow channel 5, an annular seal 18 is provided on the valve body portion 16, by way of which annular seal 18 said valve body portion 16 abuts sealingly against the housing inside circumference of the valve housing 2. An annular seal 19 is also arranged on the guide portion 17 of the valve carrier 4, said annular seal sealing the pot interior of the pot-shaped valve body in relation to the traversing fluid. In this case, the annular seal 19 abuts sealingly against the pot inside circumference of the valve body 3. It can be seen in FIG. 6 that the valve body portion 16 and the guide portion 17 of the valve carrier 4 are connected by a connection portion 20. The at least one channel opening 8 of the through-flow channel 5 is arranged in this case on said connection portion 20. In this case, the connection portion 20 is contoured in such a manner or comprises such a diameter that the channel opening 8 is closed by the pot inside circumference wall of the pot-shaped valve body 3 with the pressure reducing valve 1 in the closed position.

Figure 4:
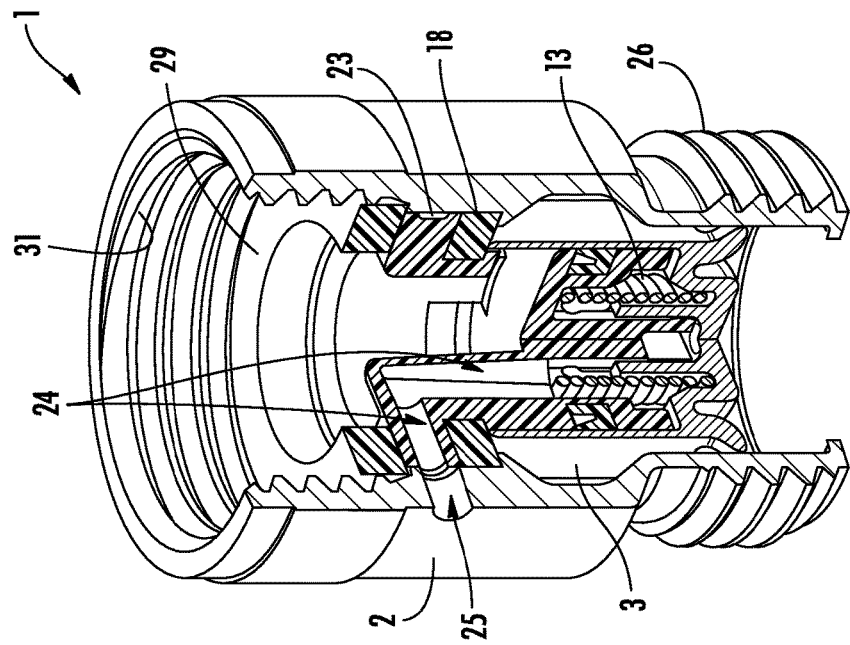
FIG. 4 shows a part longitudinal section of the pressure-reducing valve from FIGS. 1 to 3 shown in its operating position, FIG. 5 also shows a part longitudinal section of the pressure-reducing valve from FIGS. 1 to 4 in its closed position.
Figure 5:
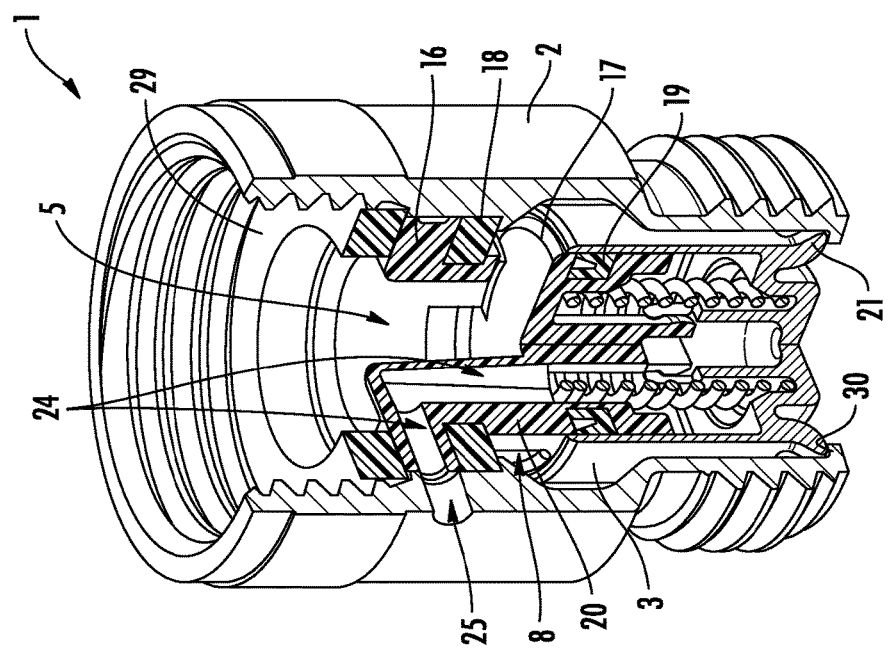
Figure 8:
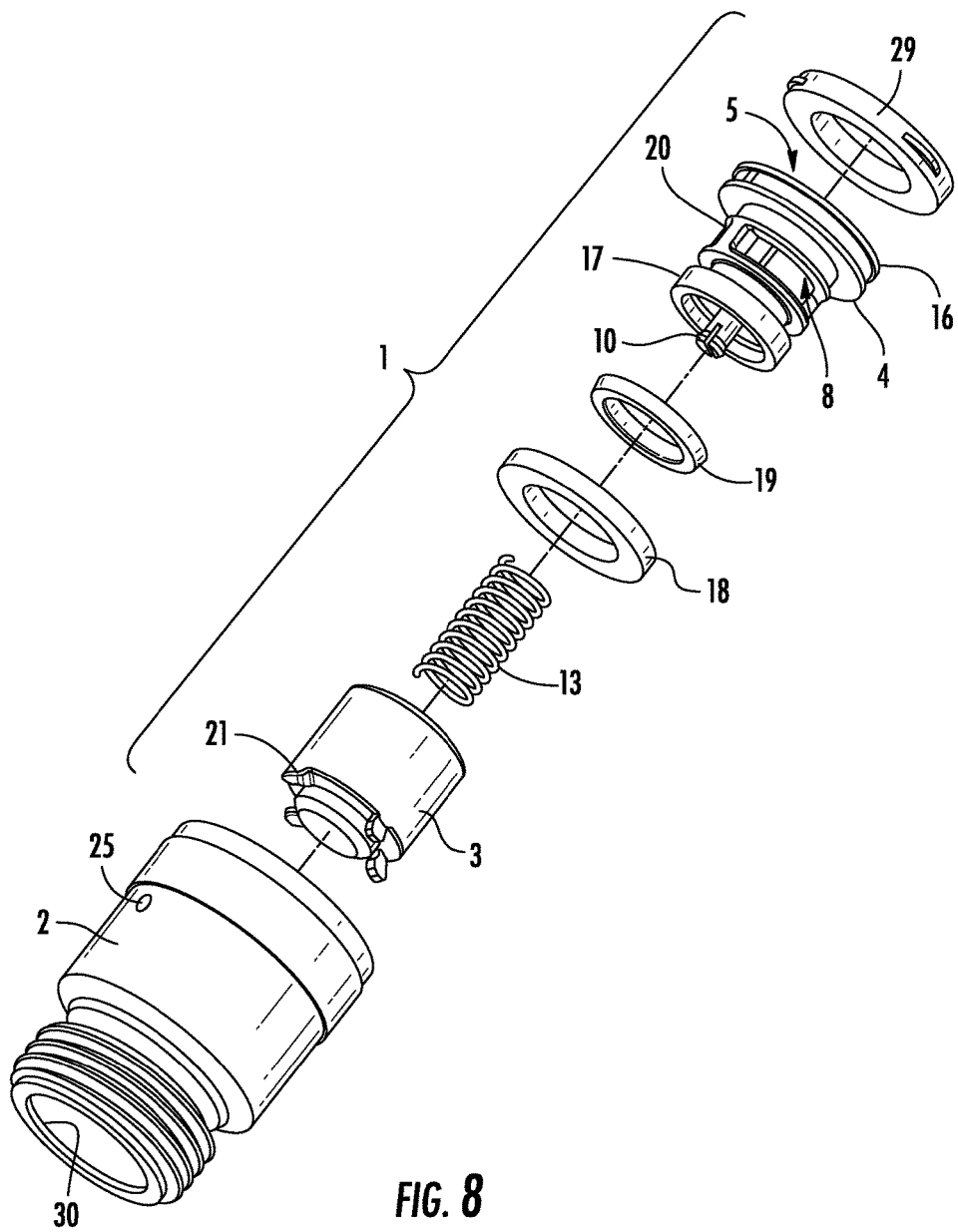
FIG. 8 shows an exploded representation of the individual parts of the pressure-reducing valve from FIGS. 1 to 7.

From a comparison of FIGS. 4 to 6, it becomes clear that at least one sliding element and here four siding elements 21, which are evenly spaced apart from one another in the circumferential direction and protrude in such a manner in the radial direction beyond the valve body 3 that an annular channel 22 is formed between the housing inside circumference of the valve housing 2, on the one hand, and the outside circumference of the valve body 3 on the other hand, are provided on the outside circumference of the valve body 3. As the valve body 3 only slides on the housing inside circumference of the valve housing 2 by way of its laterally protruding sliding elements 21, the friction surface of the valve body 3 is effectively reduced. With the valve 1 in the open position, the sliding elements 21 abut against an annular shoulder 30 on the housing inside circumference of the valve housing 2.

From a comparison of FIGS. 4 to 6, it becomes clear that an annular groove 23 is provided on the outside circumference of the valve body portion 16. This annular groove 23 is connected to the pot interior of the pot-shaped valve body 3 by means of at least one ventilation channel 24. At least one ventilation opening 25, which opens out in the annular groove 23, is provided in the valve housing 2 of the pressure-reducing valve 1. During the sliding movements of the valve body 3, the air trapped in the pot interior of the pot-shaped valve body 3 is able to escape by the ventilation channel 24 and the ventilation opening 25. In this way, unwanted counter pressure is prevented from being able to be built up in the pot interior of the valve body 3 when the pressure of the fluid on the outlet side presses the valve body 3 onto the guide portion 17 of the valve carrier 4.

On its inflow side, the valve housing 2 comprises an external thread 26 and on its outflow side a complementary internal thread 31. The valve housing 2 can be screwed onto the hose connection of a flexible hose line on the inflow side, for example, in order to protect said flexible hose line from excessive fluid pressure and from pressure-related bursting. In this case, the valve carrier 4 with its valve carrier portion 16 is fixedly clamped between an annular shoulder 27, which is arranged on the housing inside circumference of the valve housing 2, and the hose connection of the flexible hose line which is not shown here in any detail. So that it is ensured that the traversing water passes through only in the region of the at least one through-flow channel 5, an annular seal 18, 29 is provided on both sides of the valve carrier portion 16. It is also possible for the pressure-reducing valve 1 shown here to be mounted between the shower plate of a shower head and the water connection in order to protect the shower plate against excessive loads when there is calcification in the region of the shower outlet openings.

LIST OF REFERENCES

1 Pressure-reducing valve
2 Valve housing
3 Valve body
4 Valve carrier
5 Through-flow channel
6 Circumferential edge
7 Valve seat
8 Channel opening
9 Retaining sleeve
10 Retaining pin
11 Stop
12 Counter stop
13 Compression spring
14 Run-on flank
15 Run-on flank
16 Valve carrier portion
17 Guide portion
18 Annular seal
19 Annular seal
20 Connection portion
21 Sliding element
22 Annular channel
23 Annular groove
24 Ventilation channel
25 Ventilation opening
26 External thread
27 Annular shoulder
29 Annular seal
30 Annular shoulder
31 Internal thread

The invention claimed is:

1. A pressure-reducing valve (1) comprising a valve housing (2), in a housing interior of which is provided a valve carrier (4) which has a through-flow channel (5), a pot-shaped valve body (3) which is guided displaceably from an open position into a closed position in opposition to a restoring force, in said closed position the valve body (3) abuts by way of a circumferential edge (6) thereof in such a manner against a valve seat (7), which is provided on the valve carrier (4), that the valve body (3) closes at least one channel opening (8) of the at least one through-flow channel (5), a retaining sleeve (9) is arranged on the valve body (3), a stop (11) is provided on the retaining sleeve (9), said stop (11) interacts with a counter stop (12) on a retaining pin (10) in such a manner that in the open position of the pressure-reducing valve (1) the stop (11) and the counter stop (12) delimit a sliding distance of the valve body (3) relative to the valve carrier (4), and the valve carrier (4) has a valve carrier portion (16), on which is provided an annular seal (18) by which the valve carrier portion (16) abuts sealingly against a housing inside circumference of the valve housing (2), retaining pin (10), which is provided on the valve carrier (4), in each case protrudes into the at least one retaining sleeve (9), the stop (11) is provided on an inside circumference of the retaining sleeve (9) and the counter stop (12) is provided on an outside circumference of the retaining pin (10), and, in the closed position of the pressure-reducing valve (1), the valve body (3) abuts by way of said circumferential edge (6) against the valve seat (7), which is provided on the valve carrier (4) and is formed by the annular seal (18), that the valve body (3) closes the at least one channel opening (8) of the at least one through-flow channel (5).

2. The pressure-reducing valve as claimed in claim 1, wherein the stop (11) is arranged on a free end face region of the retaining sleeve (9).

3. The pressure-reducing valve as claimed in claim 1, wherein the counter stop (12) is arranged on a free end face region of the retaining pin (10).

4. The pressure-reducing valve as claimed in claim 1, wherein at least one of the stop (11) or the counter stop (12) comprises a projection extending on a respective one of the inside circumference or outside circumference.

5. The pressure-reducing valve as claimed in claim 4, wherein at least one of the projections comprises a run-up gradient or run-up flank (14; 15) which tapers toward a free end face of the retaining sleeve (9) or of the retaining pin (10).

6. The pressure-reducing valve as claimed in claim 1, wherein the retaining pin (10) and the retaining sleeve (9) are aligned coaxially with respect to one another and to a valve housing longitudinal axis.

7. The pressure-reducing valve as claimed in claim 1, wherein the pressure-reducing valve comprises at least one restoring element which is realized as a helical compression spring (13).

8. The pressure-reducing valve as claimed in claim 7, wherein the helical compression spring (13) engages around the retaining pin (10) and the retaining sleeve (9).

9. The pressure-reducing valve as claimed in claim 1, wherein the valve carrier portion (16) of the valve carrier (4) is formed with a plate-shape.

10. The pressure-reducing valve as claimed in claim 1, wherein the valve carrier (4) has a guide portion (17), on which the pot-shaped valve body (3) is displaceably guided by way of a valve body inside circumference.

11. The pressure-reducing valve as claimed in claim 10, wherein an annular seal (19) is provided on the guide portion (17).

12. The pressure-reducing valve as claimed in claim 11, wherein the valve carrier portion (16) and the guide portion (17) of the valve carrier (4) are connected by a connection portion (20).

13. The pressure-reducing valve as claimed in claim 12, wherein the at least one channel opening (8) of the at least one through-flow channel (5) is provided on the connection portion (20).

14. The pressure-reducing valve as claimed in claim 1, wherein at least one sliding element (21) is provided on an outside circumference of the valve body (3), said at least one sliding element (21) protrudes in a radial direction beyond the valve body (3) that an annular channel (22) is formed between a housing inside circumference of the valve housing (2) and the outside circumference of the valve body (3).

* * * * *